United States Patent
Wolff

[15] 3,675,342
[45] July 11, 1972

[54] FIRE FIGHTING TRAINER

[72] Inventor: Hanns H. Wolff, Orlando, Fla.

[73] Assignee: The United States of America as represented by the Secretary of the Navy

[22] Filed: March 9, 1971

[21] Appl. No.: 122,399

[52] U.S. Cl. .................................................35/10, 169/1 R
[51] Int. Cl. ...........................................................G09b 9/00
[58] Field of Search ..........................35/10, 13; 235/184, 185; 169/1 R, 1 A, 2 R

[56] References Cited

UNITED STATES PATENTS

| | | | |
|---|---|---|---|
| 3,359,652 | 12/1967 | Prosser et al. | 35/10 |
| 3,451,147 | 6/1969 | Mehlig et al. | 35/13 |
| 3,156,908 | 11/1964 | Kopan et al. | 169/1 R X |

Primary Examiner—Wm. H. Grieb
Attorney—Richard S. Sciascia and John W. Pease

[57] ABSTRACT

A fire fighting trainer comprising a matrix of adjacent fire simulation units of gas jets or lamps, each unit under the control of a processor circuit and sensor controls through which each of said units may be energized or de-energized to respective "on" and "off" conditions from a switch means through an activating circuit, to simulate an actual fire and through switch activating sensor means responsive to water spray or, in the alternative, to light rays to deactivate said actuating circuit and thereby said units. The processor also including a holding circuit and time delay means to permit automatic re-energizing of said activating circuit, indicating flashback, if the sensors are not activated for a selected time duration and otherwise to hold said activating circuit in de-energized condition. The processor circuit also including energy dissipation means for modifying the time period of said time delay means in accordance with the time interval between repeated sensor actuations prior to the establishment of a holding coil action and additional time delay means for simulating flashback from the effect of adjacent unextinguished units where all units are not extinguished in a given time period. A further aspect of the invention residing in the provision of multiple sensor means of selectively different sensitivity for each fire simulation unit to simulate progressive extinguishment of each simulation unit.

9 Claims, 5 Drawing Figures

INVENTOR

HANNS H. WOLFF

BY

ATTORNEY

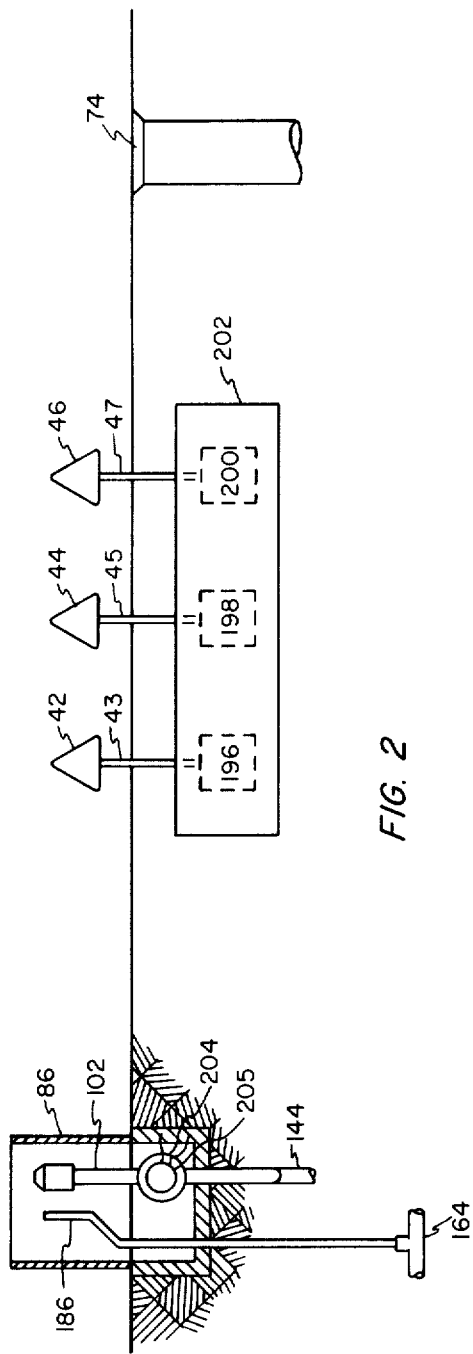
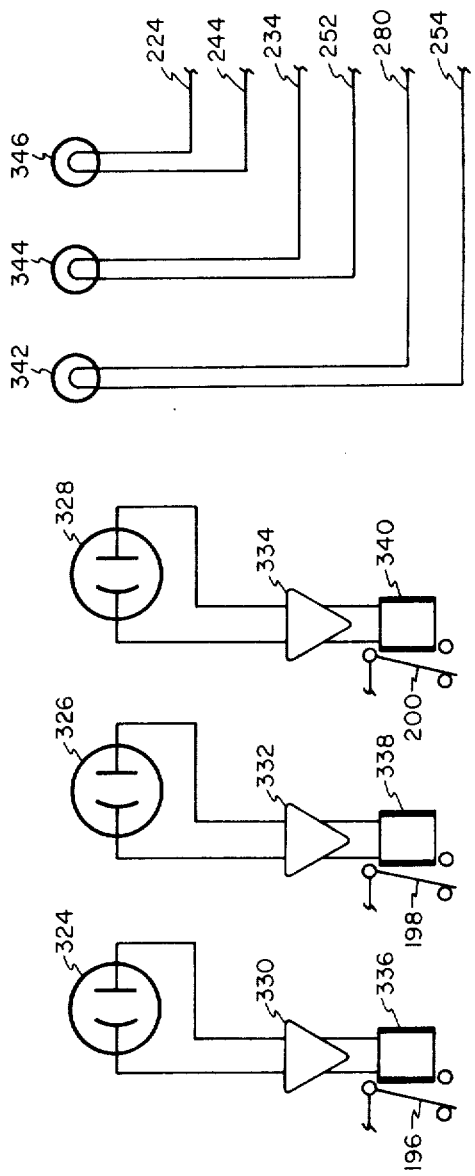
INVENTOR
HANNS H. WOLFF
BY
ATTORNEY

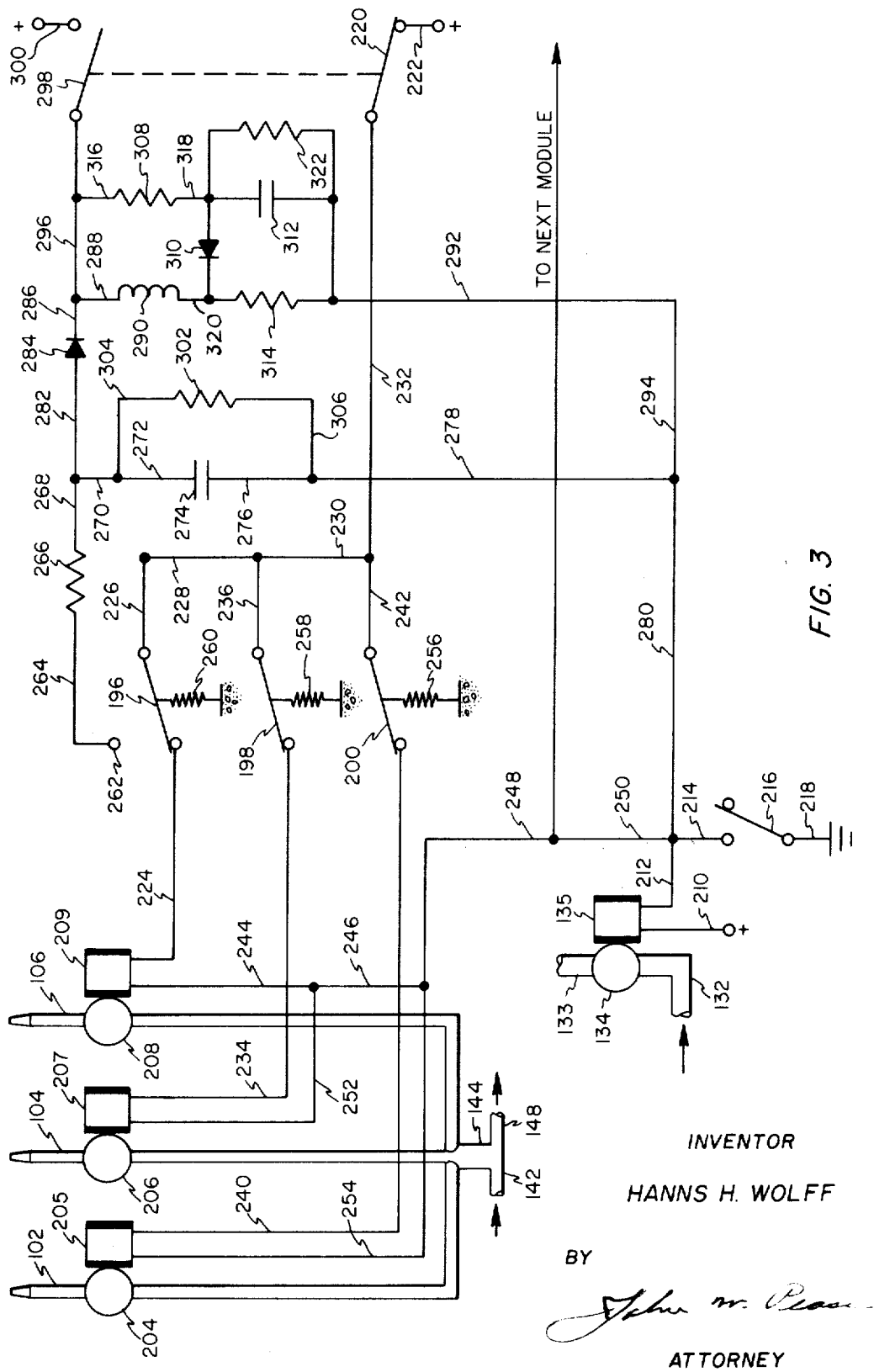

3,675,342

FIRE FIGHTING TRAINER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to the field of simulators and more particularly to the simulation of an actual fire covering an area and the progressive extinguishing of the fire by simulated hosing means for the purpose of training fire fighters.

Fire fighting training in the past and at present has been and continues to be conducted by using a distributed source of oil that is ignited and in providing trainees with fire extinguishing means suited to reduce and eventually extinguish the fire. Disadvantages of the present training system is that they are not only extremely dangerous in view of possible flashback, particularly in enclosed areas, but also that such oil fires release a considerable amount of gases, smoke and particles which contribute heavily to the pollution of the air.

SUMMARY OF THE INVENTION

The invention comprises a matrix of gas nozzles defining a simulated fire area, normally closed valve means for connecting each nozzle to a source of gas, means for opening the valves by remote control, sensor means responsive to a water stream or alternatively to a light beam for holding the valves closed during sensor activation simulating the hosing normally required to extinguish an actual fire, and time delay holding circuit means to permit simulation of flashback if the hosing is not continued for a selected time period to prevent flashback and otherwise to maintain the fire extinguished after removal of the hosing operation. Additional means are also provided to inactivate the holding circuit after a further time delay to reopen the valves to simulate flashback where all fire areas are not put out in a given time period to prevent flashback. The invention further contemplates a multiple arrangement of sensors and nozzles in each node of the matrix to simulate closing of the valves progressively and proportionately to the average intensity and direction of the ray of water or beam of light.

BRIEF DESCRIPTION OF THE DRAWINGS

FIG. 2 shows in enlarged view one gas fire simulation unit and associated valve actuating means of the matrix of units shown in FIG. 1 taken on line 2—2 of FIG. 1;

FIG. 3 shows in enlarged diagrammatic form the several gas burners of one fire simulation unit and details of a suitable processing circuit means as applied to the control of each of three nozzles constituting a fire simulation unit;

FIG. 4 shows diagrammatically a modification employing light responsive sensors responsive to use of a beam of light in extinguishing the fire; and FIG. 5 illustrates diagrammatically the provision of lamps in place of gas nozzles.

DESCRIPTION OF THE PREFERRED EMBODIMENT

Figure 1:
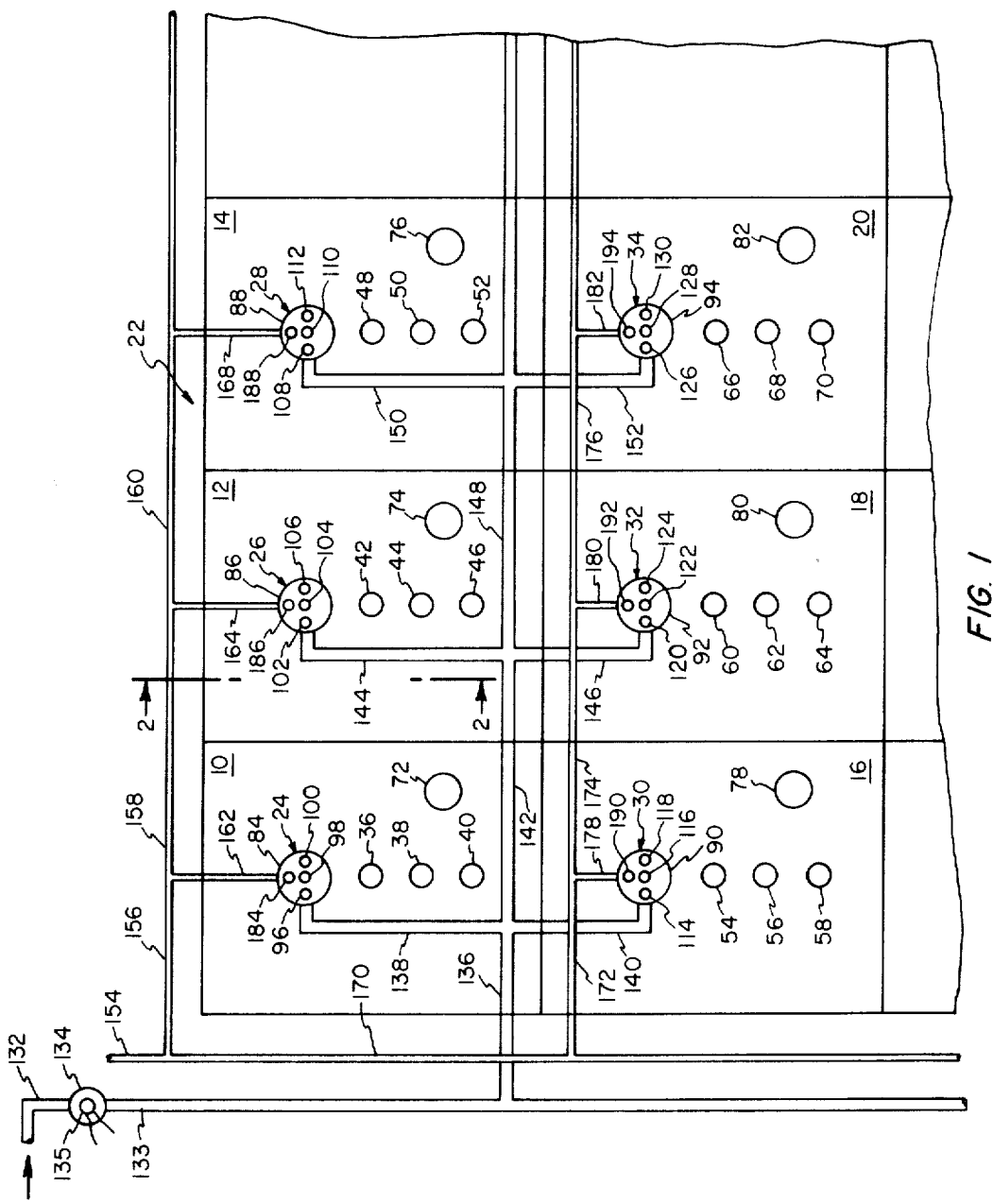
FIG. 1 illustrates diagrammatically an arrangement of gas nozzles and associated valves forming a matrix of fire simulation units connected to a supply gas line.

To illustrate a preferred embodiment of my invention there is shown in FIG. 1 a plurality of fire simulation modules, 10, 12, 14, 16, 18 and 20 arranged in a matrix to define a fire simulation area 22. Each of the modules includes a fire simulation unit exemplified by the gas fired units 24, 26, 28, 30, 32 and 34 for simulating an actual fire in each module area of the matrix of modules. Each module is provided with a plurality of spaced sensors exemplified by the sensors 36, 38, 40, 42, 44, 46, 48, 50, 52, 54, 56, 58, 60, 62, 64, 66, 68 and 70, there being three sensors in each module to react to a water spray to progressively extinguish the fire through electrical means as will be hereinafter described. Drain ports 72, 74, 76, 78, 80, and 82 are provided to drain water from the respective module areas. Each of the fire simulation units is surrounded by a shield, as represented by the shields 84, 86, 88, 90, 92, and 94 to avoid the application of water spray directly upon the gas flame of the gas burner fire simulation units. Each of the fire simulation units is provided with three gas burners as indicated by the numerals 96, 98, and 100 for unit 24; 102, 104, and 106 for unit 26; 108, 110, and 112 for unit 28; 114, 116, and 118 for unit 30; 120, 122, and 124 for unit 32; and 126, 128, and 130 for unit 34.

Gas is supplied from a main gas line 132 via a common solenoid operated gas valve 134 and thence via feeder gas lines 133, 136, 138, 140, 142, 144, 146, 148, 150, and 152 to the several fire simulation units indicated. A supply of air or oxygen is provided to the fire simulation units via lines 154, 156, 158, 160, 162, 164, 168, 170, 172, 174, 176, 178, 180, and 182 and respective air nozzles indicated at 184, 186, 188, 190, 192, and 194.

Referring to FIG. 2, there is shown in diagrammatically enlarged form a lateral view of module 12 taken on lines 2- 2 of FIG. 1. This view shows the arrangement including the shield 86, air jet tube 186, burner 102, sensors 42, 44, and 46, and drain 74, all previously described in relation to FIG. 1. As shown in FIG. 2, the water spray responsive sensors 42, 44 and 46 are connected by respective mechanical connector means 43, 45, and 47 to normally closed adjustably tensioned switches 196, 198, and 200 forming part of processor circuitry enclosed in a box 202. It is to be understood that in a commercial application the processor circuit can be remotely located.

In FIG. 3 there is shown diagrammatically in enlarged form the nozzles and associated processor circuitry of fire simulation unit 26 of FIG. 1, it being understood that each of the remaining fire simulation units is provided with processor circuitry as will be described in detail for unit 26. As shown in FIG. 1, gas is supplied to unit 26 from the main gas line 132 via the main solenoid control valve 134 and feeder lines 133, 136, 142 and 144. In FIG. 3, there is shown the main gas line 132, main solenoid operated valve 134 and feeder lines 142, 144, and 148 of FIG. 1. The remaining feed lines are omitted to simplify the drawing.

Considering now the details of processor circuitry for controlling the operation of fire simulation unit 26, the supply of gas to the respective nozzles 102, 104, and 106 is controlled by respective normally closed solenoid valves 204, 206, and 208 having respective solenoids 205, 207, and 209. Gas is supplied to the valves 204, 206, and 208 from the main supply valve 134 responsive to the operation of its solenoid 135. Solenoid 135 is connected by a line 210 to a source of positive potential indicated and by lines 212, 214, normally open starting switch 216 and a line 218 to ground. Thus, when switch 216 is closed, solenoid 135 is energized to open valve 134 and supply gas to solenoid valves 204, 206, and 208.

One side of the respective solenoids 205, 207, and 209 is connected respectively through normally closed switches 196, 198, and 200 and through a common normally closed switch 220 to a positive source of voltage indicated by line 222. Thus, solenoid 209 is connected to positive source line 222 via a line 224, switch 196, lines 226, 228, 230, 232 and switch 220. Solenoid 207 is energized from source 222 via a line 234, switch 198, lines 236, 230, and 232 and switch 220. Solenoid 205 is energized from source 222 via a line 240, switch 200, lines 242 and 232 and switch 220.

The other sides of respective solenoids are connected to ground when switch 216 is closed. Thus, solenoid 209 is connected to ground via lines 244, 246, 248, 250, 214, switch 216 and line 218. Solenoid 207 is connected to ground via lines 252, 246, 248, 250, 214, switch 216 and line 218. Solenoid 205 is connected to ground via lines 254, 248, 250, 214, switch 216 and line 218.

Considering the circuit of FIG. 3 as thus far described, the closing of switch 216 provides the necessary ground to pass electric current through each of the solenoids 135, 205, 207, and 209. Energizing relay 135 opens normally closed main gas valve 134. Energizing solenoids 205, 207 and 209 opens normally closed nozzle valves 204, 206, and 208. Thus, a full flow of gas is obtained from each of the nozzles 102, 104, and 106 responsive to closing switch 216. This condition corresponds to simulation of full fire in unit 26.

The fire of unit 26 is extinguished by de-energizing the solenoids 205, 207, and 209 responsive to opening the switches 200, 198, and 196 in turn responsive to actuation of the sensors 46, 44, and 42. To simulate a gradual extinguishment of the fire, the valves are proportioned such that valve 204 provides 10 percent, valve 206 another 10 percent, and valve 208 provides 80 percent of the total gas supply to the nozzle arrangement. Further, to simulate the effect upon extinguishing the fire due to the degree of water pressure on the sensors 46, 44, and 42, means are provided to selectively adjust the degree of sensitivity of the switches 200, 198, and 196. This may be accomplished, for example, by spring means indicated at 256, 258, and 260 of selectively different closing force. Thus, switch 200 may be opened by a relatively low water pressure on sensor 46. Switch 198 may be opened by a moderate force on sensor 44 and switch 196 may be opened by a relatively high force on sensor 42. The fire will thus be progressively extinguished by moving a hose (not shown) progressively closer to the sensors 46, 44, and 42 to progressively increase water pressure on the sensors.

Removal of activation of the sensors immediately following extinguishment of the fire will result in immediate reclosing of the switches 196, 198, and 200, thereby re-igniting the fire. This characteristic of the described system simulates flashback of the fire due to failure to hose the area for a sufficient length of time to avoid flashback. To provide for simulation also of the condition where hosing has been continued for a sufficient time to cool the area to a degree that flashback does not occur, there is provided according to the invention a time delay holding circuit means for holding said fire simulation unit in "off" condition responsive to maintaining said sensors actuated for a selected time period.

Thus, as shown in FIG. 3, at least switch 196 is provided with an open contact 262 connected via a line 264, a charging resistor 266, lines 268, 270, and 272, a capacitor 274, lines 276, 278, 280, and 214, switch 216 and line 218 to ground indicated. Line 268 is connected via aline 282, a diode 284, lines 286 and 288, a relay holding coil 290, a line 320, resistor 314, lines 292, 294, 280, 214, switch 216 and line 218 to ground indicated. An input to holding coil 290 is also arranged via a line 296, normally open switch 298 to a positive potential source line 300. Switches 298 and 220 are gang operated as indicated by the dot-dash line shown.

In operation when switch 196 is activated by hosing of the fire, valve 208 is closed (valves 205 and 207 are also closed in this condition since switches 198 and 200 are of a higher sensitivity than switch 196 and thus closed), capacitor 274 is charged via switch 220, contact 262 of switch 196 and charging resistor 266. As soon as capacitor 274 has reached a certain charge level a current flows via the Zener diode 284 through relay coil 290 which opens its switch 220 and closes its switch 298. Switch 298 is a holding switch and is adjusted such that it closes slightly before switch 220 opens. Thus, if the hosing is continued for a time period sufficient to charge capacitor 274 the holding circuit is actuated and re-flash of the fire is avoided.

If the hosing is continuous for a period of time not quite sufficient to develop a charge on the capacitor 274 sufficient to actuate the holding coil 290, a subsequent hosing would actuate the holding coil in a very short period of time because the capacitor would require little additional charge. This short hosing period would be proper if the subsequent hosing immediately followed the initial hosing. However, the longer the delay in re-hosing, the longer the time period which should be required for energizing the holding coil to provide realistic simulation. Therefore, a discharge resistor 302 is provided connected across capacitor 274 by lines 304 and 306. The resistor 302 gradually discharges the capacitor 274 while the sensors are in inactivated condition, such that the hosing time required to extinguish the gas fire is dependent upon the time period delay in re-hosing where re-hosing was discontinued prior to excitation of the holding coil 290. A sufficient time delay will ultimately restore the capacitor to its initial unchanged condition before beginning a new exercise. Opening of switch 216 then restores the system to its before-exercise condition.

In extinguishing a fire it is also desirable to extinguish the entire area, i.e., the area covered by all of the fire simulation units, within a given time period such that flashback of an extinguished unit area does not occur due to the heat of adjacent unextinguished unit areas. To provide for simulation of this feature I provide an additional time delay means for deenergizing the holding coil 290 after a selected time delay additional to the initial time delay provided for energizing the holding coil 290. This function may be accomplished by any suitable time delay means, one of which is represented by a charging resistor 308, Zener diode 310, capacitor 321 and resistor 314. Resistor 308 is connected by a line 316 to line 296 to receive an input from source line 300 when switch 298 is closed. The other end of resistor 308 is connected by line 318 through Zener diode 310, line 320, and resistor 314 to line 292. Capacitor 312 is connected from line 318 to line 292 and a resistor 322 is connected across the capacitor 312 as indicated to reset the capacitor charge to zero after operation.

In operation, closing the switch 298 charges capacitor 312 in a selected time period to a level of voltage discharging through Zener 310 to back bias coil 290 and release the holding effect of the coil, thereby opening switch 298 and closing switch 220 such that the burners 102, 104, and 106 are re-ignited, simulating flashback.

The shapes of the vane type sensors 42, 44, and 46 are such that the associated switches will be actuated over a realistic range of approach with a fire hose (not shown). They may be, for example, in the form of cylinders or circular cones. They should be arranged with respect to the gas nozzle fire simulation unit and the normal approach by the fire fighter trainee such that they are exposed to the water hose (not shown) of the trainee. The number of gas nozzles and switch control sensors disclosed herein is given only as an example. The number should be selected such that a realistic simulation of fire is developed.

It is to be noted also that in place of the mechanical sensors shown in FIG. 2, one may employ, as shown in FIG. 4, a group of light detectors 324, 326, and 328 for operating the associated switching means 196, 198, and 200 such that the hosing operation may be accomplished by a source of light beam (not shown), preferably infra-red or ultra-violet light beam. The light sensitive devices 324, 326, and 328 would be selected for progressive different degrees of sensitivity. Suitable amplifier means 330, 332, and 334 and solenoid means 336, 338, and 340 are shown connected to the light sensors to activate the associated switch means.

It is contemplated further that in place of the gas system and associated solenoid valves, one may employ one or more light means to simulate a fire. Thus, as shown in FIG. 5, lamps 342, 344, and 346 may be connected to the energizing lines 224, 244, 234, 252, 240, and 254. The lamps may be used electively with either the mechanical or light sensitive sensor means. The same is true of the gas fired units.

Advantages of the above described fire simulation training device include the realistic progressive reduction and eventual destruction of a simulated fire without the release of gases and particles to pollute the air and with the elimination of fire hazard to the trainee during the training exercise. Features of the device include the simulation of reflash of a particular unit where hosing was not continued for a sufficient time to normally extinguish the fire. Simulation of reduced hosing time where a unit are has been hosed an insufficient time to extinguish the fire and then rehosed, as where the trainee is playing a hose back and forth over several unit areas of the fire, and the simulation of reflash of the fire from adjacent units where all of the fire units have not been extinguished in a given total period of time.

What is claimed is:

1. A fire simulator for training in fire fighting and control comprising:
   a. a plurality of fire simulation modules arranged in a matrix to define a fire simulation area, each module including
   b. a fire simulation unit conditionable to "on" and "off" conditions,
   c. a processor circuit for controlling the "on" and "off" conditions of said unit,
   d. deactivating sensor means for activation by an applied stimulus representative of operation of fire extinguishing apparatus and connected to said processor circuit to condition said circuit to "off" condition of said unit,
   e. said processor circuit including a holding circuit with time delay means for holding said unit in "off" condition when said sensors have been actuated for a selected time period and otherwise to allow reflash of said unit if said sensor stimulus is removed prior to the selected time period.

2. Apparatus according to claim 1
   a. said fire simulation unit including a plurality of discrete fire simulation elements,
   b. said deactivating sensor means including a plurality of sensor means of selectively different sensitivity, one for each simulation element, to simulate the progressive extinguishment of a fire responsive to the degree of applied fire extinguishing stimulus.

3. Apparatus according to claim 1
   a. said fire simulation unit comprising at least one gas burner nozzle having a normally closed solenoid operated gas valve connected for operation by said processor circuit to "on" condition when said processor circuit is energized, and to "off" condition when said processor circuit is deactivated by operation of said deactivating sensor means.

4. Apparatus according to claim 1
   a. said fire simulation unit comprising at least one electric lamp connected to said processor circuit for normally "on" condition when said processor circuit is energized and to "off" condition when said processor circuit is deactivated by operation of said deactivating sensor means.

5. Apparatus according to claim 1
   a. said deactivating sensor means comprising at least one mechanically operated vane type sensor connected to said processor circuit to condition the latter to "off" condition of said unit responsive to a spray of water on said sensor means.

6. Apparatus according to claim 1
   a. said deactivating sensor means comprising at least one light sensor responsive to a ray of light to deactivate said processor circuit to extinguish said fire simulation unit.

7. Apparatus according to claim 1
   a. said processor circuit time delay means including a first time delay means connected to actuate said holding coil and additional time delay means responsive to the actuation of said holding circuit to de-energize said holding coil means and permit reflash of said fire simulation unit after said additional time delay,
   b. said additional time delay means being selected in time period to provide sufficient time to permit all fire simulation units to be extinguished in an orderly progressive fashion, and if not extinguished in that time then to permit flashback of previously extinguished units.

8. Apparatus according to claim 2
   a. said processor circuit time delay means including a first time delay means connected to actuate said holding coil and additional time delay means responsive to the actuation of said holding circuit to de-energize said holding coil means and permit reflash of said fire simulation unit after said additional time delay,
   b. said additional time delay means being selected in time period to provide sufficient time to permit all fire simulation units to be extinguished in an orderly progressive fashion, and if not extinguished in that time then to permit flashback of previously extinguished units.

9. Apparatus according to claim 7
   a. said first time delay means including a charging resistor, capacitor and Zener diode for actuating said holding coil and bleed resistor means across said capacitor for coordinating the total time delay period required for actuation of said holding coil to the time period delays, if any, in actuating and reactuating said sensors,
   b. said additional time delay means including a charging resistor, capacitor and Zener diode connected to back bias and release said holding coil after a selected time period.

* * * * *